US012665505B2

(12) United States Patent
Becermis et al.

(10) Patent No.: US 12,665,505 B2
(45) Date of Patent: Jun. 23, 2026

(54) CHARGE PUMP CIRCUIT

(71) Applicant: TEXAS INSTRUMENTS INCORPORATED, Dallas, TX (US)

(72) Inventors: Mustafa Becermis, Freising (DE); Qiao Yang, Munich (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 128 days.

(21) Appl. No.: 18/808,180

(22) Filed: Aug. 19, 2024

(65) Prior Publication Data

US 2026/0051813 A1      Feb. 19, 2026

(51) Int. Cl.
| | |
|---|---|
| *H02M 3/07* | (2006.01) |
| *H02J 7/34* | (2006.01) |
| *H02J 7/90* | (2026.01) |
| *H02M 1/00* | (2006.01) |
| *H02M 1/14* | (2006.01) |

(52) U.S. Cl.
CPC ............... *H02M 3/07* (2013.01); *H02J 7/345* (2013.01); *H02J 7/90* (2026.01); *H02M 1/0009* (2021.05); *H02J 2207/50* (2020.01); *H02M 1/14* (2013.01)

(58) Field of Classification Search
CPC ........ H02M 3/07; H02M 1/0009; H02M 1/14; H02J 7/345; H02J 7/90
See application file for complete search history.

(56) References Cited

U.S. PATENT DOCUMENTS

| | | | |
|---|---|---|---|
| 6,169,458 B1 * | 1/2001 | Shenoy ................. | H03L 7/0896 |
| | | | 331/25 |
| 2008/0101521 A1 * | 5/2008 | Lee ........................ | H03L 7/0995 |
| | | | 375/371 |
| 2019/0115829 A1 * | 4/2019 | Oporta ..................... | H02J 7/02 |
| 2025/0062685 A1 * | 2/2025 | Tuikkanen .......... | H02M 1/0045 |

* cited by examiner

*Primary Examiner* — Sibin Chen
(74) *Attorney, Agent, or Firm* — Frank D. Cimino

(57) ABSTRACT

An apparatus includes first and second capacitors, first and second switches, a current source, a first circuit, and a second circuit. The first switch is coupled between a first terminal of the first capacitor and a reference terminal. The current source has an input coupled to a power terminal. The second switch is coupled between the first terminal of the first capacitor and an output of the current source. The second capacitor has a first terminal coupled to the reference terminal. The first circuit has a first terminal coupled to a second terminal of the second capacitor, and a second terminal coupled to a second terminal of the first capacitor. The second circuit has a first input coupled to a third terminal of the first circuit, a second input coupled to the power terminal, and an output coupled to the output of the current source.

20 Claims, 6 Drawing Sheets

100

CP_OUT

110

128    130

132    134

112

BOTTOM PLATE CHARGER
114

124    126

CP_IN 106    120

108 PHI1

102

104 PHI2    $C_{par,bottom}$

122 PHI2

116

118 PHI1    $C_{par,bottom}$

200

CP_OUT

110

128    130

214

208

132    134

1:A₁

112

1:A₁          202

124    126

206    PHI1          212    PHI2

CP_IN 106          120          A₂:1          A₂:1

204          210

108    PHI1
102

122    PHI2          116

104    PHI2          C_par,bottom

118    PHI1          C_par,bottom

CHARGE PUMP CIRCUIT

BACKGROUND

Many electronic circuits apply multiple operational voltages. In some such circuits, a charge pump circuit may be used to generate an operational voltage. For example, in a circuit that applies a first voltage and a second voltage that is greater than the first voltage, a charge pump circuit may be used to generate the second voltage from the first voltage. Charge pump circuits use switched capacitors to convert an input voltage to an output voltage that may be higher than, or negative relative to, the input voltage. In a charge pump circuit, switches coupled to a capacitor are operated in sequence to first charge the capacitor from the input voltage and then transfer the charge to the output.

SUMMARY

In one example, a circuit includes a first capacitor, a second capacitor, a first switch, a second switch, a switching circuit, and a bottom plate charger circuit. The first capacitor has a first terminal and a second terminal. The second capacitor has a first terminal coupled to a reference terminal, and a second terminal. The first switch is configured to connect the first terminal of the first capacitor to the reference terminal. The second switch is configured to connect the first terminal of the first capacitor to a power terminal. The switching circuit has a first terminal coupled to the second terminal of the first capacitor, a second terminal coupled to the second terminal of the second capacitor, and a third terminal. The switching circuit is configured to conduct current from the first capacitor to the second capacitor. The bottom plate charger circuit has a first input coupled to the power terminal, a second input coupled to the third terminal of the switching circuit, and an output coupled to the second switch. The bottom plate charger circuit is configured to detect flow of a first current from the second capacitor to the first capacitor, and conduct a second current from the power terminal to the first capacitor responsive to detection of the first current.

In another example, an apparatus includes a first capacitor, a first switch, a current source, a second switch, a second capacitor, a first circuit, and a second circuit. The first capacitor has a first terminal and a second terminal. The first switch is coupled between the first terminal of the first capacitor and a reference terminal. The current source has an output, and an input coupled to a power terminal. The second switch is coupled between the first terminal of the first capacitor and the output of the current source. The second capacitor has a first terminal coupled to the reference terminal and a second terminal. The first circuit has a first terminal coupled to the second terminal of the second capacitor, and a second terminal coupled to the second terminal of the first capacitor, and a third terminal. The second circuit has a first input coupled to the third terminal of the first circuit, a second input coupled to the power terminal, and an output coupled to the output of the current source.

In a further example, a system includes a transistor, an error amplifier, and a charge pump circuit. The transistor has a first terminal, a second terminal, and a control terminal. The error amplifier has a first input coupled to a reference voltage circuit, a second input coupled to the second terminal of the transistor, an output coupled to the control terminal of the transistor, and a power terminal. The charge pump circuit has an output coupled to the power terminal of the error amplifier, and a power terminal configured to receive an input voltage. The charge pump circuit includes a first capacitor, a first switch, a current source, a second switch, a second capacitor, a switching circuit, and a bottom plate charger circuit. The first capacitor has a first terminal and a second terminal. The first switch is coupled between the first terminal of the first capacitor and a reference terminal. The current source has an output, and an input coupled to a power terminal. The second switch is coupled between the first terminal of the first capacitor and the output of the current source. The second capacitor has a first terminal coupled to the reference terminal and a second terminal. The switching circuit has a first terminal coupled to the second terminal of the second capacitor, a second terminal coupled to the second terminal of the first capacitor, and a third terminal. The bottom plate charger circuit has a first input coupled to the third terminal of the switching circuit, a second input coupled to the power terminal, and an output coupled to the output of the current source.

DETAILED DESCRIPTION

Figure 1:
FIG. 1 is a schematic diagram of an example charge pump circuit that includes a bottom plate charger circuit to reduce output ripple.

FIG. 1 is a schematic diagram of an example charge pump circuit 100. The charge pump circuit 100 includes capacitors 102, 110, and 116, switches 104, 108, 118, and 122, current sources 106 and 120, a switching circuit 112, and a bottom plate charger circuit 114. The capacitors 102 and 116 are flyback capacitors of the charge pump circuit 100, and the capacitor 110 is the output capacitor of the charge pump circuit 100. A first terminal (e.g., a bottom plate) of the capacitor 102 is coupled to a reference terminal (e.g., ground) via the switch 104. A first terminal of the switch 104 is coupled to the first terminal of the capacitor 102, and a second terminal of the switch 104 is coupled to the reference terminal. The switch 108 is coupled between the first terminal of the capacitor 102 and an output of the current source 106. A first terminal of the switch 108 is coupled to the first terminal of the capacitor 102, and a second terminal of the switch 108 is coupled to the output of the current source 106. An input of the current source 106 is coupled to a power terminal (CP_IN). A second terminal (e.g., a top plate) of the capacitor 102 is coupled to the switching circuit 112.

A first terminal (e.g., a bottom plate) of the capacitor 116 is coupled to the reference terminal via the switch 118. A first terminal of the switch 118 is coupled to the first terminal of the capacitor 116, and a second terminal of the switch 118 is coupled to the reference terminal. The switch 122 is coupled between the first terminal of the capacitor 116 and an output of the current source 120. A first terminal of the switch 122 is coupled to the first terminal of the capacitor 116, and a second terminal of the switch 122 is coupled to the output of the current source 120. An input of the current source 120 is coupled to the power terminal. A second terminal (e.g., a top plate) of the capacitor 116 is coupled to the switching circuit 112.

The charge pump circuit 100 operates in 2 phases to charge the capacitors 102 and 116, and transfer charge from the capacitors 102 and 116 to the capacitor 110. In the charge pump circuit 100, control signal PHI1 defines operational phase 1, and control signal PHI2 defines operational phase 2. PHI1 and PHI2 may be complementary. In operational phase 1, the switch 118 is closed to connect the first terminal of the capacitor 116 to the reference terminal, the switch 122 is open to disconnect the first terminal of the capacitor 116 from the output of the current source 120, the switch 108 is closed to connect the first terminal of the capacitor 102 to the output of the current source 106, and the switch 104 is open to disconnect the capacitor 102 from the reference terminal. In operational phase 1, the capacitor 116 is charged to the voltage at CP_IN, and the voltage at the second terminal of the capacitor 102 is boosted by the voltage at CP_IN.

In operational phase 2, the switch 122 is closed to connect the first terminal of the capacitor 116 to the output of the current source 120, the switch 118 is open to disconnect the first terminal of the capacitor 116 from the reference terminal, the switch 104 is closed to connect the first terminal of the capacitor 102 to the reference terminal, and the switch 108 is open to disconnect the first terminal of the capacitor 102 from the output of the current source 106. In operational phase 2, the capacitor 102 is charged to the voltage at CP_IN, and the voltage at the second terminal of the capacitor 116 is boosted by the voltage at CP_IN.

The switching circuit 112 transfers charge from the capacitor 102 and the capacitor 116 to the capacitor 110, and provides voltage at the second terminal of the capacitor 102 and the capacitor 116. The switching circuit 112 includes transistors 124, 126, 128, and 130, and resistors 132 and 134. The transistor 124 and the transistor 126 may be n-channel field effect transistors (NFETs). The transistor 128 and the transistor 130 may be p-channel field effect transistors (PFETs). A first terminal (e.g., source) of the transistor 124 is coupled to the power terminal, and a second terminal (e.g., drain) of the transistor 124 is coupled to the second terminal of the capacitor 102. A control terminal (e.g., gate) of the transistor 124 is coupled to the second terminal of the capacitor 116. A first terminal (e.g., source) of the transistor 126 is coupled to the power terminal, and a second terminal (e.g., drain) of the transistor 126 is coupled to the second terminal of the capacitor 116. A control terminal (e.g., gate) of the transistor 126 is coupled to the second terminal of the capacitor 102. In operational phase 1, the transistor 126 is turned on, and the transistor 124 is turned off. In operational phase 2, the transistor 124 is turned on, and the transistor 126 is turned off.

A first terminal (e.g., source) of the transistor 128 is coupled to a first terminal (e.g., top plate) of the capacitor 110. A second terminal (e.g., bottom plate) of the capacitor 110 is coupled to the reference terminal. A second terminal (e.g., drain) of the transistor 128 is coupled to the second terminal of the capacitor 102 via the resistor 132. A control terminal (e.g., gate) of the transistor 128 is coupled to the second terminal of the transistor 126. A first terminal (e.g., source) of the transistor 130 is coupled to a first terminal of the capacitor 110. A second terminal (e.g., drain) of the transistor 130 is coupled to the second terminal of the capacitor 116 via the resistor 134. A control terminal (e.g., gate) of the transistor 130 is coupled to the second terminal of the transistor 124. In operational phase 1, the transistor 128 is turned on, and the transistor 130 is turned off. In operational phase 2, the transistor 130 is turned on, and the transistor 128 is turned off.

At the start of operational phase 1, when the switch 108 closes, the parasitic capacitance at the first terminal of the capacitor 102 (shown as $C_{par,bottom}$) delays the charging of the first terminal of the capacitor 102 because the current source 106 cannot provide sufficient current to instantaneously charge the parasitic capacitance. While the parasitic capacitance is being charged, a current flows from the capacitor 110 through the switching circuit 112 to the capacitor 102. This current discharges the capacitor 110 and causes the output voltage of the charge pump circuit 100 to drop. The drop in the output voltage may be reduced by increasing the capacitance of the capacitor 110, which increases the size and cost of the charge pump circuit 100. Charging of the parasitic capacitance at the first terminal of the capacitor 116, at the start of second operational phase, causes a similar reverse current flow and drop in the output voltage of the charge pump circuit 100.

The charge pump circuit 100 reduces the reverse current flowing to charge the parasitic capacitance at the first terminal of the capacitor 102 and the first terminal of the capacitor 116, which reduces ripple in the output voltage of the charge pump circuit 100. The bottom plate charger circuit 114 includes a reverse current detection circuit that detects reverse current flowing through the switching circuit 112 and a current source that is enabled by detection of reverse current to provide charging current flow from the power terminal to the capacitors 102 and 116 to charge the parasitic capacitances. Accordingly, the flow of current from the capacitor 110 to the capacitor 102 and the capacitor 116 is reduced, and ripple in the output voltage of the charge pump circuit 100 is reduced. The bottom plate charger circuit 114 includes an output coupled to the output of the current source 106 for charging the capacitor 102, an output coupled to the output of the current source 120 for charging the capacitor 116. The bottom plate charger circuit 114 also includes an input coupled to the second terminal of the transistor 128 for detecting reverse current flow, and an input coupled to the second terminal of the transistor 130 for detecting reverse current flow. Implementation and operation of examples of the bottom plate charger circuit 114 are described with reference to FIGS. 2 and 3.

Figure 2:
FIG. 2 is a schematic diagram of an example charge pump circuit that includes a first implementation of a bottom plate charger circuit.

FIG. 2 is a schematic diagram of an example charge pump circuit 200 that includes a bottom plate charger circuit 214. The bottom plate charger circuit 214 is an implementation of the bottom plate charger circuit 114. The bottom plate charger circuit 214 includes current sources 202, 204, 208, and 210, and switches 206 and 212. The current sources 202, 204, 208, and 210 are controllable current sources that provide a first current based on a second current. The current source 202 includes a control input coupled to the second terminal of the transistor 128 and a control output coupled to the second terminal of the transistor 124. Current flowing from the capacitor 110 to the capacitor 102 flows through the control input and output of the current source 202, and responsive to the reverse current flow, the current source 202 provides a trigger current. The current source 202 has a second input (a current input) coupled to the second terminal of the capacitor 110, and a second output (a current output) coupled to the switch 206, through which the trigger current flows.

The switch 206 is coupled between the second output of the current source 202 and the current source 204. A first terminal of the switch 206 is coupled to the second output of the current source 202, and a second terminal of the switch 206 is coupled to the current source 204. The switch 206 is closed during operational phase 1, and open during operational phase 2. The current source 204 includes a control input coupled to the second terminal of the switch 206 and a control output coupled to the output of the current source 106. Responsive to the trigger current, the current source 204 generates a charging current to charge the parasitic capacitance at the first terminal of the capacitor 102. The current source 204 has a second input coupled to the power terminal, and a second output coupled to the output of the current source 106. The charging current flows through the second input and output of the current source 204 to the capacitor 102. The charging current provided by the current source 204 charges the parasitic capacitance at the first terminal of the capacitor 102 and reduces the current flowing from the capacitor 110 to the capacitor 102 to charge the parasitic capacitance.

The current source 208 includes a control input coupled to the second terminal of the transistor 130 and a control output coupled to the second terminal of the transistor 126. Current flowing from the capacitor 110 to the capacitor 116 flows through the control input and output of the current source 208, and responsive to the reverse current flow, the current source 208 provides a trigger current. The current source 208 has a second input coupled to the second terminal of the capacitor 110, and a second output coupled to the switch 212, through which the trigger current flows.

The switch 212 is coupled between the second output of the current source 208 and the current source 210. A first terminal of the switch 212 is coupled to the second output of the current source 208, and a second terminal of the switch 212 is coupled to the current source 210. The switch 212 is closed during operational phase 2, and open during operational phase 1. The current source 210 includes a control input coupled to the second terminal of the switch 212 and a control output coupled to the output of the current source 120. Responsive to the trigger current, the current source 210 provides a charging current to charge the parasitic capacitance at the first terminal of the capacitor 116. The current source 210 has a second input coupled to the power terminal, and a second output coupled to the output of the current source 120. The charging current flows through the second input and output of the current source 210 to the capacitor 116. The charging current provided by the current source 210 charges the parasitic capacitance at the first terminal of the capacitor 116 and reduces the current flowing from the capacitor 110 to the capacitor 116 to charge the parasitic capacitance.

Figure 3:
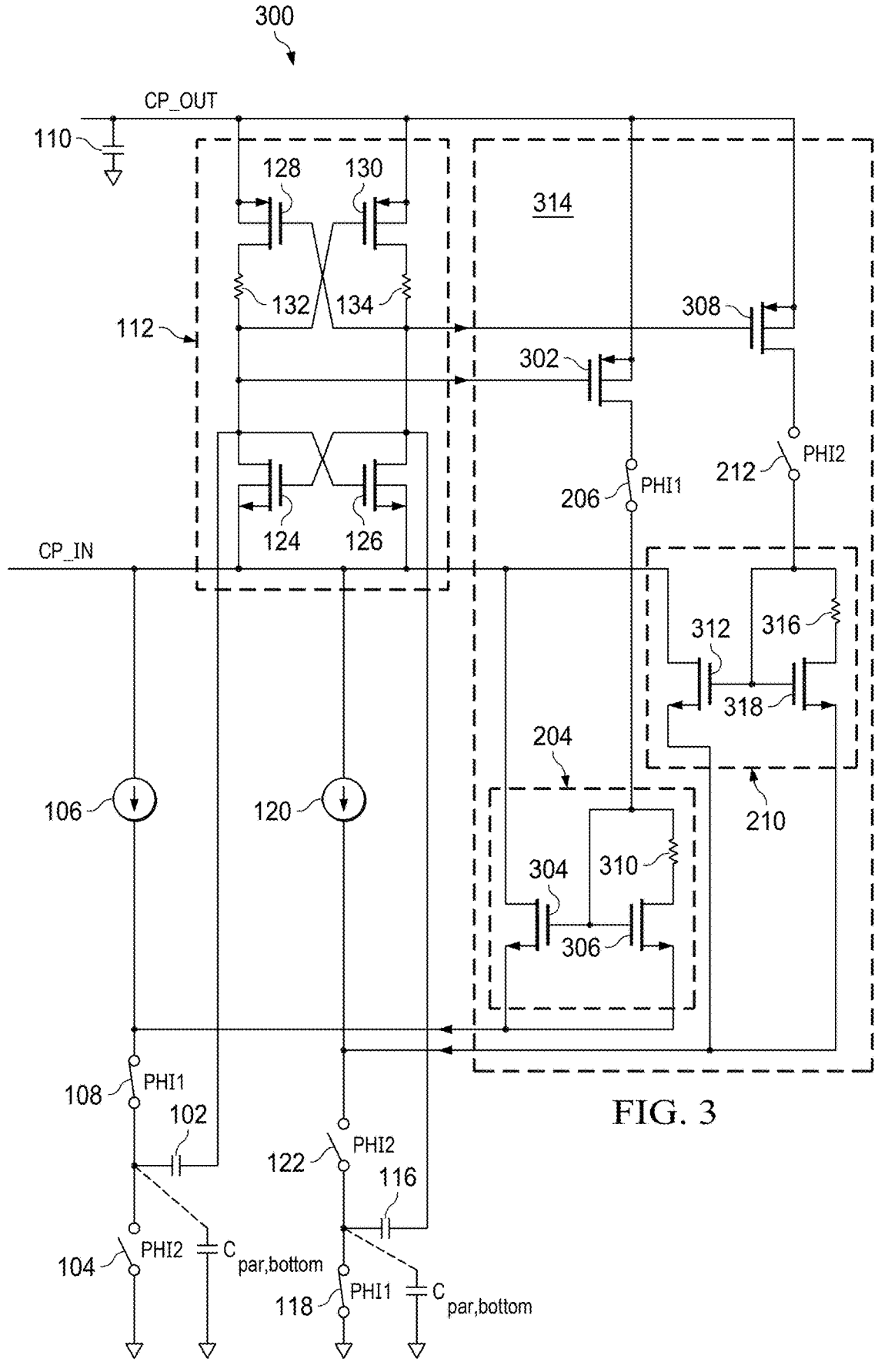
FIG. 3 is a schematic diagram of an example charge pump circuit that includes a second implementation of a bottom plate charger circuit.

FIG. 3 is a schematic diagram of an example charge pump circuit 300 that includes a bottom plate charger circuit 314. The bottom plate charger circuit 314 is an implementation of the bottom plate charger circuit 114. The bottom plate charger circuit 314 includes transistors 302 and 308, current sources 204 and 210, and switches 206 and 212. The transistor 302 and the transistor 308 may be PFETs. The transistor 302 has a first terminal (e.g., source) coupled to the second terminal of the capacitor 110, a second terminal (e.g., drain) coupled to the switch 206, and a control terminal (e.g., gate) coupled to the second terminal of the transistor 128. Reverse current flow through the resistor 132 causes the voltage at the control terminal of the transistor 302 to drop, which turns on the transistor 302 and causes a trigger current to flow through the transistor 302 to the current source 204.

A first terminal of the switch 206 is coupled to the second terminal of the transistor 302, and a second terminal of the switch 206 is coupled to the current source 204.

The current source 204 includes transistors 304 and 306, and a resistor 310. The transistor 304 and the transistor 306 may be NFETs connected as a current mirror circuit. The transistor 306 has a first terminal (e.g., drain) coupled to the second terminal of the switch 206 via the resistor 310. A first terminal of the resistor 310 is coupled to the second terminal of the switch 206, and a second terminal of the resistor 310 is coupled to the first terminal of the transistor 306. The transistor 306 has a second terminal (e.g., source) coupled to the output of the current source 106, and a control terminal (e.g., gate) coupled to the first terminal of the resistor 310. The transistor 304 has a first terminal (e.g., drain) coupled to the power terminal, a second terminal (e.g., source) coupled to the output of the current source 106, and a control terminal (e.g., gate) coupled to the control terminal of the transistor 306. Flow of the trigger current through the transistor 306 causes a charging current to flow through the transistor 304. The charging current may be a multiple of the trigger current by scaling the transistor 304 relative to the transistor 306. The charging current provided by the transistor 304 charges the parasitic capacitance at the first terminal of the capacitor 102 and reduces the current flowing from the capacitor 110 to the capacitor 102 to charge the parasitic capacitance.

The transistor 308 has a first terminal (e.g., source) coupled to the second terminal of the capacitor 110, a second terminal (e.g., drain) coupled to the switch 212, and a control terminal (e.g., gate) coupled to the second terminal of the transistor 130. Reverse current flow through the resistor 134 causes the voltage at the control terminal of the transistor 308 to drop, which turns on the transistor 308 and causes a trigger current to flow through the transistor 308 to the current source 210. A first terminal of the switch 212 is coupled to the second terminal of the transistor 308, and a second terminal of the switch 212 is coupled to the current source 210.

The current source 210 includes transistors 312 and 318, and a resistor 316. The transistor 312 and the transistor 318 may be NFETs connected as a current mirror circuit. The transistor 318 has a first terminal (e.g., drain) coupled to the second terminal of the switch 212 via the resistor 316. A first terminal of the resistor 316 is coupled to the second terminal of the switch 212, and a second terminal of the resistor 316 is coupled to the first terminal of the transistor 318. The transistor 318 has a second terminal (e.g., source) coupled to the output of the current source 120, and a control terminal (e.g., gate) coupled to the first terminal of the resistor 316. The transistor 312 has a first terminal (e.g., drain) coupled to the power terminal, a second terminal (e.g., source) coupled to the output of the current source 120, and a control terminal (e.g., gate) coupled to the control terminal of the transistor 318. Flow of the trigger current through the transistor 318 causes a charging current to flow through the transistor 312. The charging current may be a multiple of the trigger current by scaling the transistor 312 relative to the transistor 318. The charging current provided by the transistor 312 charges the parasitic capacitance at the first terminal of the capacitor 116 and reduces the current flowing from the capacitor 110 to the capacitor 116 to charge the parasitic capacitance.

Figure 4:
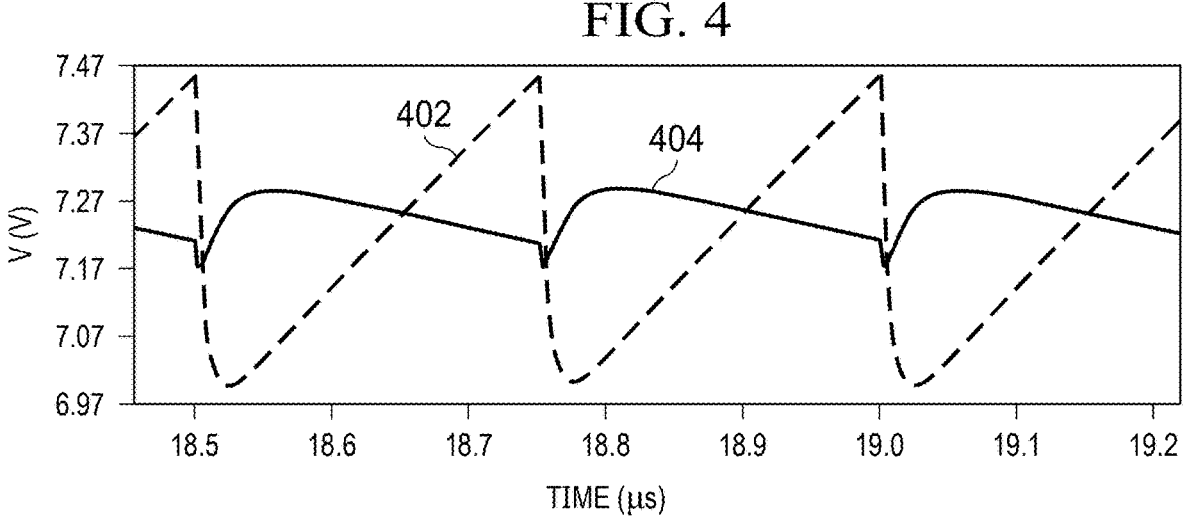
FIGS. 4-6 are graphs showing comparison of charge pump circuit output ripple with and without a bottom plate charger circuit.
Figure 5:
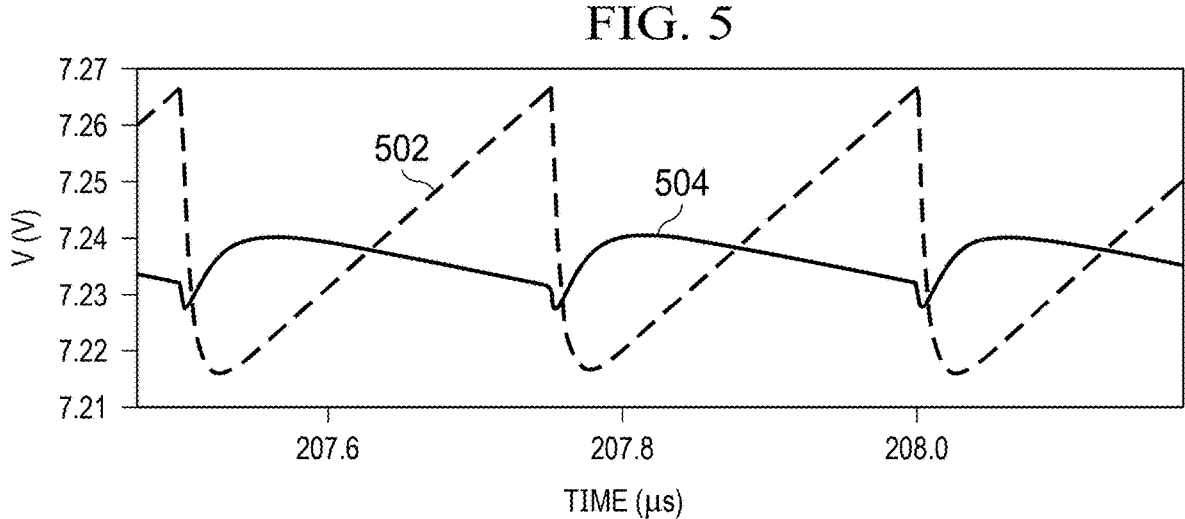
Figure 6:
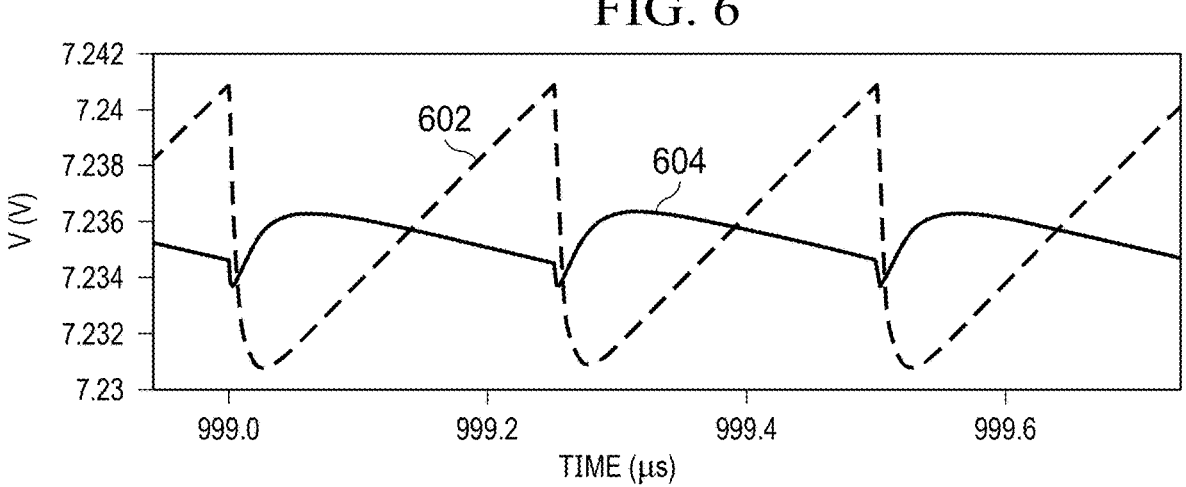

FIGS. 4-6 are graphs showing comparison of charge pump circuit output ripple with and without a bottom plate charger circuit. FIG. 4 shows charge pump circuit output ripple with the capacitor 110 having a capacitance of about 2 picofarads. In FIG. 4, the curve 402 shows peak-to-peak ripple on the output voltage of the charge pump circuit without a bottom plate charger, and the curve 404 shows peak-to-peak ripple on the output voltage of the charge pump circuit with the bottom plate charger circuit 114. Without the bottom plate charger circuit 114, about 457 millivolts of peak-to-peak ripple is present on the output voltage of the charge pump circuit. With the bottom plate charger circuit 114, the peak-to-peak ripple on the output voltage of the charge pump circuit is reduced to about 117 millivolts.

FIG. 5 shows charge pump circuit output ripple with the capacitor 110 having a capacitance of about 20 picofarads. In FIG. 5, the curve 502 shows peak-to-peak ripple on the output voltage of the charge pump circuit without a bottom plate charger, and the curve 504 shows peak-to-peak ripple on the output voltage of the charge pump circuit with the bottom plate charger circuit 114. Without the bottom plate charger circuit 114, about 50 millivolts of peak-to-peak ripple is present on the output voltage of the charge pump circuit. With the bottom plate charger circuit 114, the peak-to-peak ripple on the output voltage of the charge pump circuit is reduced to about 13 millivolts.

FIG. 6 shows charge pump circuit output ripple with the capacitor 110 having a capacitance of about 200 picofarads. In FIG. 6, the curve 602 shows peak-to-peak ripple on the output voltage of the charge pump circuit without a bottom plate charger, and the curve 604 shows peak-to-peak ripple on the output voltage of the charge pump circuit with the bottom plate charger circuit 114. Without the bottom plate charger circuit 114, about 10.2 millivolts of peak-to-peak ripple is present on the output voltage of the charge pump circuit. With the bottom plate charger circuit 114, the peak-to-peak ripple on the output voltage of the charge pump circuit is reduced to about 2.6 millivolts.

Figure 7:
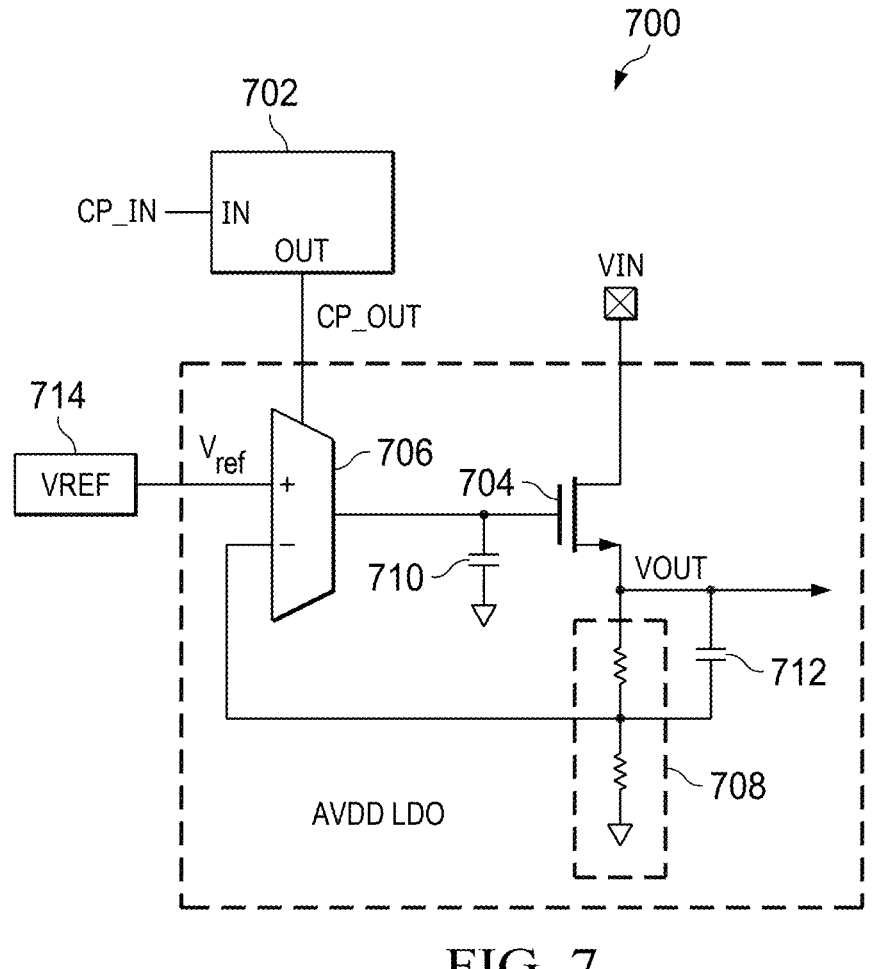
FIG. 7 is a block diagram of an example linear voltage regulator circuit that includes a charge pump circuit with a bottom plate charger circuit to reduce output ripple.

FIG. 7 is a block diagram of an example linear voltage regulator circuit 700. The linear voltage regulator circuit 700 includes a charge pump circuit 702, a pass transistor 704, an error amplifier 706, a voltage divider 708, and filter capacitors 710 and 712. The pass transistor 704 may be an NFET. The pass transistor 704 has a first terminal (e.g., drain) coupled to an input voltage terminal (VIN), a second terminal (e.g., source) coupled to an output voltage terminal (VOUT), and a control terminal (e.g., gate) coupled to the error amplifier 706. The error amplifier 706 has a first input coupled to a reference voltage circuit 714 for receipt of a reference voltage VREF, a second input coupled to the second terminal of the pass transistor 704 via the voltage divider 708, and an output coupled to the control terminal of the pass transistor 704. The error amplifier 706 compares the regulator output voltage received at the second input of the error amplifier 706 to the reference voltage received at the first input of the error amplifier 706, and provides an error signal at the output of the error amplifier 706. The error signal controls the pass transistor 704 to regulate the output voltage of the linear voltage regulator circuit 700.

The charge pump circuit 702 generates voltage CP_OUT for powering the error amplifier 706. The charge pump circuit 702 is an implementation of the charge pump circuit 100, the charge pump circuit 200, or the charge pump circuit 300 and includes a bottom plate charger circuit (e.g., the bottom plate charger circuit 114, the bottom plate charger circuit 214, or the bottom plate charger circuit 314). The charge pump circuit 702 provides the output voltage CP_OUT with reduced ripple, which reduces the ripple in the error signal and in the output voltage of the linear voltage regulator circuit 700.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) (n-type transistor) or a p-channel FET (PFET)) (p-type transistor)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input (or transistor control terminal) is the gate, and the current terminals are the drain and source. In the context of a BJT, the control input is the base, and the current terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A circuit comprising:
a first capacitor having a first terminal and a second terminal;
a second capacitor having a first terminal coupled to a reference terminal, and a second terminal;
a first switch configured to connect the first terminal of the first capacitor to the reference terminal;
a second switch configured to connect the first terminal of the first capacitor to a power terminal;
a switching circuit having a first terminal coupled to the second terminal of the first capacitor, a second terminal coupled to the second terminal of the second capacitor, and a third terminal, the switching circuit configured to conduct current from the first capacitor to the second capacitor; and
a bottom plate charger circuit having a first input coupled to the power terminal, a second input coupled to the third terminal of the switching circuit, and an output coupled to the second switch, the bottom plate charger circuit configured to detect flow of a first current from the second capacitor to the first capacitor, and conduct a second current from the power terminal to the first capacitor responsive to detection of the first current.

2. The circuit of claim 1, further comprising:
a third capacitor having a first terminal and a second terminal;
a third switch configured to connect the first terminal of the third capacitor to the reference terminal;
a fourth switch configured to connect the first terminal of the third capacitor to a power terminal;

wherein:
the output of the bottom plate charger circuit is a first output;
the switching circuit has a third terminal coupled to the second terminal of the third capacitor, and a fourth terminal, the switching circuit configured to conduct current from the third capacitor to the second capacitor; and
the bottom plate charger circuit has a third input coupled to the fourth terminal of the switching circuit, and a second output coupled to the fourth switch, the bottom plate charger circuit configured to detect flow of a third current from the second capacitor to the third capacitor, and conduct a fourth current from the power terminal to the third capacitor responsive to detection of the third current.

3. The circuit of claim 2, wherein the switching circuit is configured to conduct current from the first capacitor or the third capacitor to the second capacitor based on a first voltage at the first capacitor and a second voltage at the second capacitor.

4. The circuit of claim 2, wherein the bottom plate charger circuit includes:
a first current source configured to provide a fifth current responsive to the third current; and
a second current source configured to provide the fourth current responsive to the fifth current.

5. The circuit of claim 4, wherein the bottom plate charger circuit includes:
a transistor configured to conduct the fifth current responsive to a voltage at the fourth terminal of the switching circuit; and
a current mirror circuit coupled to the transistor, the current mirror circuit configured to provide the fourth current responsive to the fifth current.

6. The circuit of claim 1, wherein the bottom plate charger circuit includes:
a first current source configured to provide a third current responsive to the first current; and
a second current source configured to provide the second current responsive to the third current.

7. The circuit of claim 1, wherein the bottom plate charger circuit includes:
a transistor configured to conduct a third current responsive to a voltage at the third terminal of the switching circuit; and
a current mirror circuit coupled to the transistor, the current mirror circuit configured to provide the second current responsive to the third current.

8. An apparatus comprising:
a first capacitor having a first terminal and a second terminal;
a first switch coupled between the first terminal of the first capacitor and a reference terminal;
a current source having an output, and an input coupled to a power terminal;
a second switch coupled between the first terminal of the first capacitor and the output of the current source;
a second capacitor having a first terminal coupled to the reference terminal and a second terminal;
a first circuit having a first terminal coupled to the second terminal of the second capacitor, and a second terminal coupled to the second terminal of the first capacitor, and a third terminal; and a second circuit having a first input coupled to the third terminal of the first circuit, a second input coupled to the power terminal, and an output coupled to the output of the current source.

9. The apparatus of claim 8, wherein:

the current source is a first current source;

the output of the second circuit is a first output;

the first circuit has a third terminal, and a fourth terminal;

the second circuit has a second input coupled to the fourth terminal of the first circuit, and a second output; and the apparatus includes:

a third capacitor having a first terminal, and a second terminal coupled to the third terminal of the first circuit;

a third switch coupled between the first terminal of the third capacitor and the reference terminal;

a second current source having an output coupled to the second output of the second circuit, and an input coupled to a power terminal; and a fourth switch coupled between the first terminal of the third capacitor and the output of the second current source.

10. The apparatus of claim 9, wherein the first circuit includes:

a first transistor having a first terminal coupled to the power terminal, a second terminal, and a control terminal;

a second transistor having a first terminal coupled to the power terminal, a second terminal coupled to the control terminal of the first transistor, and a control terminal coupled to the second terminal of the first transistor;

a third transistor having a first terminal coupled to the second terminal of the second capacitor, a second terminal, and a control terminal;

a fourth transistor having a first terminal coupled to the first terminal of the third transistor, a second terminal, and a control terminal;

a first resistor having a first terminal coupled to the second terminal of the third transistor, and a second terminal coupled to the first input of the second circuit and the control terminal of the fourth transistor; and a second resistor having a first terminal coupled to the second terminal of the fourth transistor, and a second terminal coupled to the second input of the second circuit and the control terminal of the third transistor.

11. The apparatus of claim 9, wherein the second circuit includes:

a second current source having a control input coupled to the fourth terminal of the first circuit, a current input coupled to the second terminal of the second capacitor, and a current output;

a third current source having a control input, a current input coupled to the power terminal, and a current output coupled to the output of the second current source; and a switch coupled between the current output of the second current source and the current input of the third current source.

12. The apparatus of claim 9, wherein the second circuit includes:

a first transistor having a first terminal coupled to the second terminal of the second capacitor, a second terminal, and a control terminal coupled to the fourth terminal of the first circuit;

a second transistor having a first terminal, a second terminal coupled to the output of the second current source, and a control terminal coupled to second terminal of the first transistor;

a resistor coupled between the first terminal of the second transistor and the second terminal of the first transistor; and a third transistor having a first terminal coupled to the power terminal, a second terminal coupled to the output of the current source, and a control terminal coupled to the control terminal of the second transistor.

13. The apparatus of claim 8, wherein:

the current source is a first current source; and the second circuit includes:

a second current source having a control input coupled to the third terminal of the first circuit, a current input coupled to the second terminal of the second capacitor, and a current output;

a third current source having a control input, a current input coupled to the power terminal, and a current output coupled to the output of the first current source; and a switch coupled between the current output of the second current source and the current input of the third current source.

14. The apparatus of claim 8, wherein the second circuit includes:

a first transistor having a first terminal coupled to the second terminal of the second capacitor, a second terminal, and a control terminal coupled to the third terminal of the first circuit;

a second transistor having a first terminal, a second terminal coupled to the output of the current source, and a control terminal coupled to second terminal of the first transistor;

a first resistor coupled between the first terminal of the second transistor and the second terminal of the first transistor; and a third transistor having a first terminal coupled to the power terminal, a second terminal coupled to the output of the current source, and a control terminal coupled to the control terminal of the second transistor.

15. A system comprising:

a transistor having a first terminal, a second terminal, and a control terminal;

an error amplifier having a first input coupled to a reference voltage circuit, a second input coupled to the second terminal of the transistor, an output coupled to the control terminal of the transistor, and a power terminal; and a charge pump circuit having an output coupled to the power terminal of the error amplifier, and a power terminal configured to receive an input voltage, the charge pump circuit including:

a first capacitor having a first terminal and a second terminal;

a first switch coupled between the first terminal of the first capacitor and a reference terminal;

a current source having an output, and an input coupled to a power terminal;

a second switch coupled between the first terminal of the first capacitor and the output of the current source;

a second capacitor having a first terminal coupled to the reference terminal and a second terminal;

a switching circuit having a first terminal coupled to the second terminal of the second capacitor, a second terminal coupled to the second terminal of the first capacitor, and a third terminal; and a bottom plate charger circuit having a first input coupled to the third terminal of the switching circuit, a second input coupled to the power terminal, and an output coupled to the output of the current source.

16. The system of claim 15, wherein:

the current source is a first current source;

the output of the bottom plate charger circuit is a first output;

the switching circuit has a third terminal, and a fourth terminal;

the bottom plate charger circuit has a second input coupled to the fourth terminal of the switching circuit, and a second output; and the charge pump circuit includes:

a third capacitor having a first terminal, and a second terminal coupled to the third terminal of the switching circuit;

a third switch coupled between the first terminal of the third capacitor and the reference terminal;

a second current source having an output coupled to the second output of the bottom plate charger circuit, and an input coupled to a power terminal; and a fourth switch coupled between the first terminal of the third capacitor and the output of the second current source.

17. The system of claim 16, wherein the bottom plate charger circuit includes:

a second current source having a control input coupled to the fourth terminal of the switching circuit, a current input coupled to the second terminal of the second capacitor, and a current output;

a third current source having a control input, a current input coupled to the power terminal, and a current output coupled to the output of the second current source; and a switch coupled between the current output of the second current source and the current input of the third current source.

18. The system of claim 16, wherein the bottom plate charger circuit includes:

a first transistor having a first terminal coupled to the second terminal of the second capacitor, a second terminal, and a control terminal coupled to the fourth terminal of the switching circuit;

a second transistor having a first terminal, a second terminal coupled to the output of the second current source, and a control terminal coupled to second terminal of the first transistor;

a resistor coupled between the first terminal of the second transistor and the second terminal of the first transistor; and a third transistor having a first terminal coupled to the power terminal, a second terminal coupled to the output of the current source, and a control terminal coupled to the control terminal of the second transistor.

19. The system of claim 15, wherein:

the current source is a first current source; and the bottom plate charger circuit includes:

a second current source having a control input coupled to the third terminal of the switching circuit, a current input coupled to the second terminal of the second capacitor, and a current output;

a third current source having a control input, a current input coupled to the power terminal, and a current output coupled to the output of the first current source; and a switch coupled between the current output of the second current source and the current input of the third current source.

20. The system of claim 15, wherein the bottom plate charger circuit includes:

a first transistor having a first terminal coupled to the second terminal of the second capacitor, a second terminal, and a control terminal coupled to the third terminal of the switching circuit;

a second transistor having a first terminal, a second terminal coupled to the output of the current source, and a control terminal coupled to second terminal of the first transistor;

a first resistor coupled between the first terminal of the second transistor and the second terminal of the first transistor; and a third transistor having a first terminal coupled to the power terminal, a second terminal coupled to the output of the current source, and a control terminal coupled to the control terminal of the second transistor.

* * * * *